United States Patent [19]

Chen

[11] Patent Number: 4,699,582

[45] Date of Patent: Oct. 13, 1987

[54] ICE CREAM SCOOP

[76] Inventor: Kuen-Pao Chen, 86, Lane 279, Section 1, Fu Chiang Road, Yung Kang Hsiang, Tainan Hsien, Taiwan

[21] Appl. No.: 893,352

[22] Filed: Aug. 5, 1986

[51] Int. Cl.$^4$ .......................... B29C 67/00; A23P 1/00
[52] U.S. Cl. ...................................... 425/187; 30/128; 249/74; 425/281; 425/284; 425/286
[58] Field of Search ............... 425/286, 118, 187, 221, 425/276, 281, 282, 283, 284; 249/74; 30/124, 128, 324

[56] References Cited

U.S. PATENT DOCUMENTS

| | | | |
|---|---|---|---|
| 772,674 | 10/1904 | Rommer | 425/286 |
| 1,642,726 | 9/1927 | Gardner | 425/286 |
| 2,239,046 | 4/1941 | Lloyd | 425/286 |
| 2,669,194 | 2/1954 | Brown | 425/286 |
| 2,756,698 | 7/1956 | Eichin et al. | 425/286 |
| 4,161,381 | 7/1979 | Sciortino | 425/286 |
| 4,392,806 | 7/1983 | Houle | 425/286 |

Primary Examiner—Willard E. Haog
Assistant Examiner—James C. Housel
Attorney, Agent, or Firm—Birch, Stewart Kolasch & Birch

[57] ABSTRACT

An improved two component ice cream scoop made of plastic, includes a bowl portion and handle portion integrally connected, the handle portion further includes an ejecting lever which is biased by a tongue spring, wherein the head portion of the ejecting lever is adjacent to the inside of said bowl portion and can be moved up when the tail portion of said ejecting lever is pressed, for pushing the ice cream out of the bowl.

9 Claims, 4 Drawing Figures

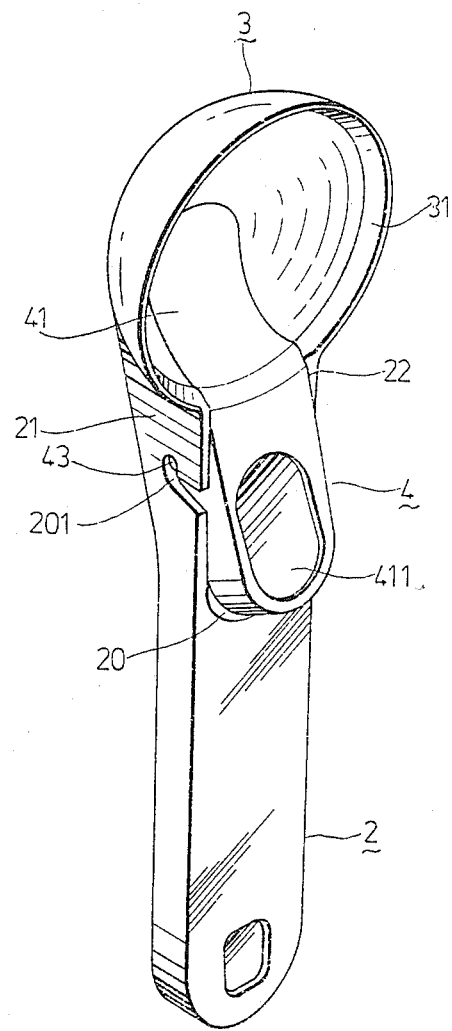
F I G. 1

ICE CREAM SCOOP

BACKGROUND OF THE INVENTION

The present invention relates to an improved ice cream scoop, particularly concerning an ice cream scoop which is simple in construction for easy assembly and saving in manufacturing cost.

Many known ice cream scoops of prior design are made of metal and include a bowl portion, a rotatable member in the bowl portion and a handle portion welded to the bowl portion. The handle portion includes two handle bars clamped together near the bowl portion with their other free ends projecting outwardly. One of the handle bars has a first inwardly bent portion with a toothed edge at its free end, and the second handle bar has a second inwardly bent portion at its free end, so that the first and second inwardly bent portions engage with each other at their ends which protrude. A rotatable rod having a gear member at one of its ends is rotatably mounted on the second inwardly bent portion of the second handle bar wherein the gear member is engaged with the toothed edge of the first inwardly bent portion. The rotatable member is a small curved plate, which is pivotally connected to the periphery of the bowl and which can be moved along the inner surface of the bowl portion.

If the two handle bars are gripped and pushed inwardly, the gear member can be moved along the toothed edge and the rod is rotated. The rotatable member in the bowl portion is connected to the rotatable rod so that as the rod is driven to rotate, the rotatable member is turned in the bowl along the inner surface to release the ice cream.

A resetting spring member is set between the two handle bars for resetting them to their initial position.

Such a prior design has the following disadvantages:
(1) If the scoop is used for a long period, the welding connecting the bowl portion to the handle bars is always wet and easily to be damaged.
(2) If the handle bars are gripped and released suddenly, the resetting spring may pop out from the handle bars and harm the user's hands.
(3) As the scoop is made of metal and assembled of many parts, the assembly is difficult, raising manufacturing cost. Moreover, the parts can not be easily separated for cleaning.

SUMMARY OF THE INVENTION

The general object of the invention is to provide an improved ice cream scoop which is simple in construction and convenient to use.

An object of the invention is to provide an ice cream scoop which is made of PC plastic, simple in construction and of few assembly parts so that the parts can be disassembled easily for cleaning and the cost is reduced.

Another object of the invention is to provide an ice cream scoop of which bowl and handle portion are integrally formed so that there is no need to worry about the two portions separating.

A further object of the invention is to provide an ice cream scoop which includes a tongue spring which is safer than the resetting spring in the prior design.

In order to achieve the aforesaid objects as well as other incidental objects and advantages, the invention includes a bowl portion and a handle portion having two extending arms integrally connected to the bowl portion.

The invention further includes a biasing means, which is a tongue spring, provided between the two extending arms of the handle, and extending from the handle portion toward the bowl portion. An ejecting lever has two projections, which are pivotally engaged to the two extending arms of the handle, and a protruded portion at its bottom surface, which is engaged to the tongue spring, so that the ejecting lever can be biased by the tongue spring and rotate to a limited extend about the axis of the two projections. The ejecting lever further includes an ejecting head portion in the bowl which is in an curved shaped conforming to the inner surface of the bowl, and a tail portion which is biased by the tongue spring so that the head portion moves up as the ejecting lever is pressed down.

Each of the two extending arms further includes a slot, the two slots being in alignment with each other, opening the upper surface of the extending arms, and curving slightly toward the bowl portion for receiving the projections of the ejecting lever.

The bowl further includes a notch at its periphery between the two extending arms, for allowing the head portion of the ejecting lever into the bowl portion, as well as a groove extending from the notch to the center of the bowl for receiving the head portion of the ejecting lever when the tail portion of the ejecting lever is biased by the tongue spring.

BRIEF DESCRIPTION OF THE DRAWINGS

These and other advantages, objects and features of the present invention will become apparent from the following detailed description of the preferred embodiments with reference to the accompanying drawings, wherein:

FIG. 1 is a perspective view of an preferred embodiment according to the invention;

DETAILED DESCRIPTION OF THE PREFERRED EMBODIMENT

Figure 2:
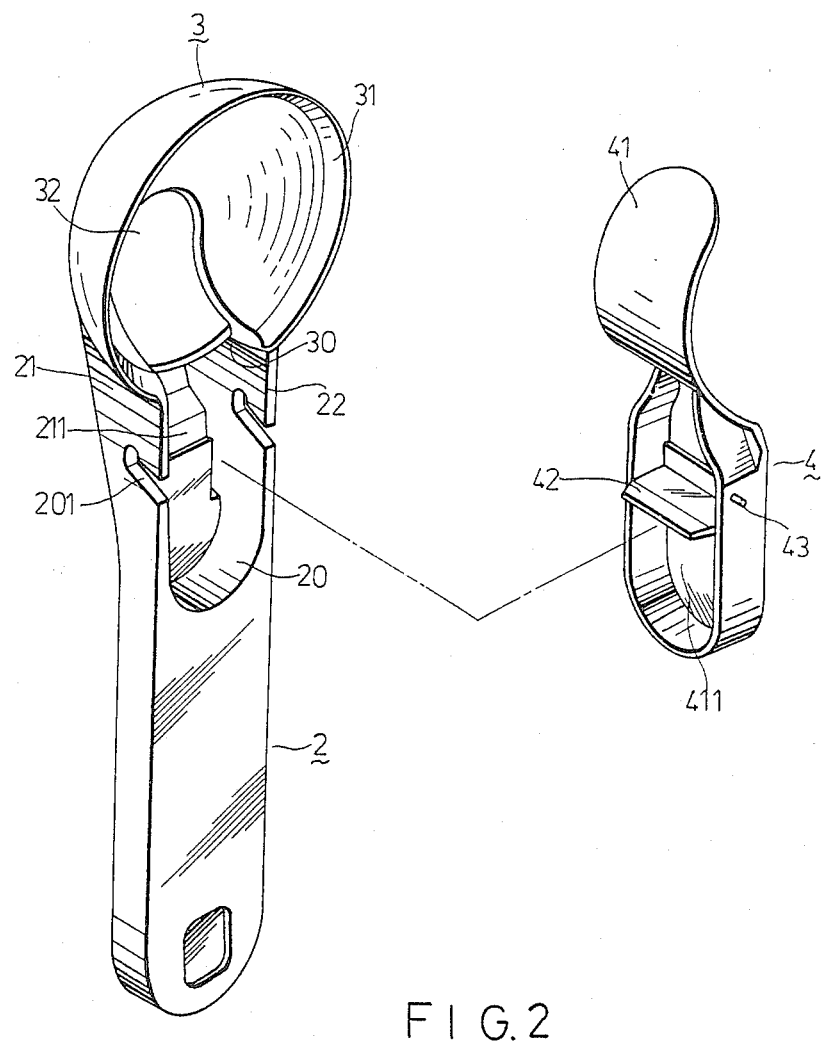
FIG. 2 is an exploded view of FIG. 1.

The following is a detailed description of the best presently contemplated embodiment of the invention. This description is not to be taken in a limiting sense, but is made merely for the purpose of illustrating the general principles of the invention.

Referring to FIG. 1 through FIG. 4, the invention is an ice cream scoop made of PC plastic with a bowl portion 3 and a handle portion 2 having a forked end portion with two extending arms 21, 22 integrally connected to the bowl portion 3. The bowl portion 3 has a bevel portion 31 along the inner edge of its periphery for scooping up the ice cream easily.

The invention further includes a biasing means which is a tongue spring 211, provided between the two extending arms 21, 22 of the handle 2, and extending from the handle portion 2 toward the bowl portion 3. Each of the two extending arms 21, 22 of the handle portion 2 further includes a slot 201 which opens at the upper surface of the extending arms 21, 22 and which curves slightly toward the bowl portion 3. The slots 201 of the two extending arms 21, 22 are in an alignment with each other.

An ejecting lever 4 includes a head portion 41 in a curved shape, its curved portion conforming to the inner curved surface of the bowl portion 3, as well as a tail portion 411 with two projections 43, which can be pivotally engaged with the extending arms 21, 22 by inserting the two projections 43 into the slots 201. The two projections 43 can be received in the slots 201 by pressing the ejecting lever 4 along the slots 201. The tongue spring 211 and the two extending arms 21, 22 form a chamber 20 for receiving the ejecting lever 4 when it is pressed down. The ejecting lever 4 is also easy to disengage from the slots 201 by depressing the ejecting lever 4 and sliding the projections 43 out of the slots 201 through their respective openings. The ejecting lever 4 further includes a protruded portion 42 at its bottom surface which is engaged with the tongue spring 211. If the projections 43 of the ejecting lever 4 are received in the slots 201, the ejecting lever 4 can be biased by the tongue spring 211.

The bowl portion 3 further includes a notch 30 at its periphery between the two extending arms 21, 22 of the handle portion 2, for allowing the head portion 41 of the ejecting lever 4 into the bowl portion 3. The bowl 3 also includes a groove 32 extending from the notch 30 to the center of the bowl 3 for receiving the head portion 41 of the ejecting lever 4 when the ejecting lever 4 is biased by the tongue spring 211. The head portion 41 can be received in the groove 32 and conforms to the inner surface of the bowl 3 as long as the tail portion 411 is biased by the tongue spring 211.

Figure 3:
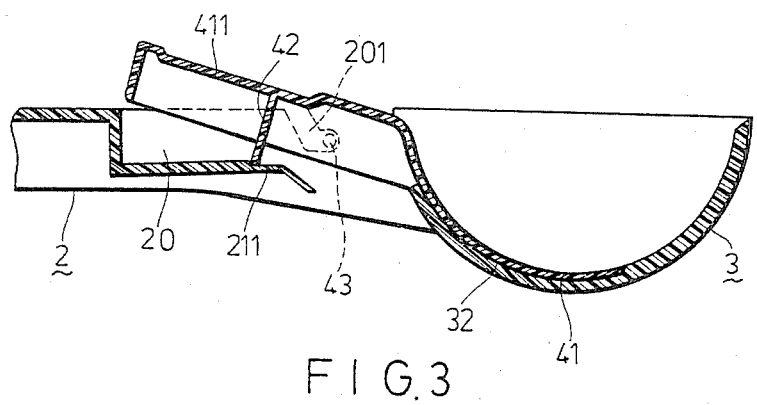
FIG. 3 is a side-sectional view of FIG. 1 showing the ejecting lever biased by the tongue spring and set in its initial position.
Figure 4:
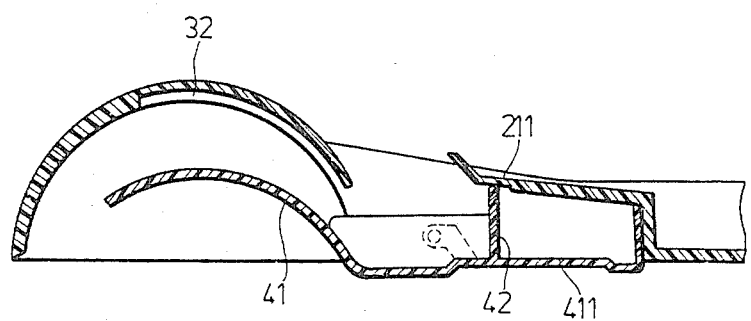
FIG. 4 is a side-sectional view of FIG. 1 showing the ejecting lever being pressed down at its tail portion and its head portion being moved up for pushing out the ice cream from the scoop bowl portion.

When the scoop is in use, the user scoops up the ice cream and then presses down the ejecting lever 4. The head portion 41 of the ejecting lever 4 which is received in the groove 32 is moved up when the tail portion 411 of the ejecting lever 4 is pressed down, so that the head portion 41 pushes out the ice cream from the bowl portion 3. (see FIG. 4). After the ice cream in the bowl 3 is released from the scoop, the user releases the ejecting lever 4, so that the ejecting lever 4 is biased by the tongue spring 211 to be reset to its initial position. (i.e. the head portion 41 of the ejecting lever 4 is received again in the groove 32 as shown in FIG. 3).

By the above-described arrangement, an ice cream scoop of the present invention is of simple construction, which can reduce production costs, and is easy to handle.

While this invention has been described with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

What is claimed is:

1. An ice cream scoop consisting essentially of a two component construction, a first component thereof comprising:

a bowl portion and a handle portion;
said bowl portion being integral with said handle portion;
a tongue spring integrally formed as part of the handle portion and extending therefrom toward the bowl portion; and the second component thereof comprising:
an ejecting lever which is pivotally engaged with said handle portion, said ejecting lever including an ejecting head portion and a tail portion, said tail portion being provided with an engaging means whereby in its relaxed state the bias of the tongue spring engages the engaging means and holds the ejecting head portion contiguous with the bowl portion, and when the tail portion is depressed against the bias of the tongue spring the ejecting head portion is raised from the bowl portion.

2. An ice cream scoop as described in claim 1, wherein said ejecting lever further includes two projections extending laterally from the tail portion and said handle portion further includes two slots on each side of said handle portion for slidably, engaging said projections of said ejecting lever whereby said ejecting lever can be easily installed or removed from said handle portion.

3. An ice cream scoop as described in claim 1, wherein said bowl portion further includes a bevel portion along the inner peripheral surface of the bowl portion.

4. An ice cream scoop as described in claim 1, wherein said ejecting lever further includes a depressed area along the upper surface and at the tail end of said ejecting lever for supporting an operator's thumb when scooping and ejecting the ice cream.

5. An ice cream scoop as described in claim 1, wherein said engaging means further includes a biasing member located substantially perpendicular to the plane of the upper horizontal surface of said tail portion whereby when said tail portion is depressed the biasing member contacts and holds the tongue spring in a tensed state; thereafter, when the pressure is removed, the tongue spring engages the biasing member and returns the ejecting lever to its original position.

6. An ice cream scoop as described in claim 1, wherein said handle portion further includes a forked portion having two support arms connected to said bowl portion.

7. An ice cream scoop as described in claim 1, wherein said bowl portion further includes a slot beginning at the top edge and continuing partially down the side of said bowl portion for receiving said head portion of the ejecting lever.

8. An ice cream scoop as described in claim 1, wherein said bowl portion further includes a groove whereby said head portion of the ejecting lever lies substantially contiguous with the interior surface of the said bowl portion when the tail portion of the ejecting lever is not depressed.

9. An ice cream scoop as described in claim 2, wherein said slots open at the upper surface of said handle portion and extend downward curving slightly toward said bowl portion.

* * * * *